Patented Apr. 19, 1932

1,854,898

UNITED STATES PATENT OFFICE

STANLEY GILL AND STANTON U. McGARY, OF HOUSTON, TEXAS, ASSIGNORS TO GULF PRODUCTION COMPANY, OF HOUSTON, TEXAS, A CORPORATION OF TEXAS

METHOD OF PROTECTING AN IMMERSED SURFACE FROM CORROSIVE ACTION

No Drawing.   Application filed September 11, 1930.   Serial No. 481,338.

Our invention relates to a method of protecting an immersed surface from corrosive action, and has to do, more particularly, with the treatment of liquid mixtures having a corrosive and a non-corrosive constituent.

The primary object of our invention is to provide a method by which normally corrosive liquid mixtures, having a corrosive constituent and a non-corrosive constituent, may be treated to render the mixture as a whole corrosively inactive without, however, materially changing the composition thereof.

A further object of our invention is to provide a method by which crude petroleum, molten sulphur, and other substances which are in themselves non-corrosive but which, when mixed with a substance such as brine form a mixture which is corrosive, may be treated to allay their corrosive property.

A still further object of our invention is to provide a method by which such liquid substances as crude petroleum, molten sulphur, and other substances, having admixed therewith brine or other metal corrosive material, may be treated to make possible their storage and conveyance in unlined tanks and pipes of steel without damage thereto.

Further objects, and objects relating to details and economies of operation, will definitely appear from the detailed description to follow. In one instance, we accomplish the objects of our invention by the means described in the following specification. Our invention is clearly pointed out in the appended claims.

For many years the conveyance and storage of corrosive mixtures such as molten sulphur and brine, crude petroleum and brine, and others, has been a serious problem. Numerous ways of solving the problem have been offered, each, however, without complete success, so that at the present time no fully satisfactory commercial method may be said to have been devised. Most of the methods heretofore known and used involve the use of special materials for the tanks and piping which are not subject to corrosion by the mixture to be contained. For the sake of stronger construction and the saving in cost, such materials are generally employed as a coating or lining backed up by a strong but less expensive casing of such material as steel or cast iron. Various difficulties present themselves in the use of lined tanks and pipes, probably the most serious one resulting from the difference in the coefficients of expansion of the metal constituting the lining and the metal of the casing. Then too, generally there are joints in such lined constructions which, however, carefully made, mechanically or by fusing, are always weak spots in the tank or pipe. Further, such systems require constant and minute inspection, since a single break in the lining provides the way through which the entire casing may be attacked and damaged. Having these and other difficulties with which to contend, as well as the great expense involved, the storage of corrosive mixtures has remained a problem and it is to its solution that this invention is directed.

We have discovered that, in many corrosive mixtures, the corrosion is effected solely and freely by one or two constituents thereof, the other constituents, though non-corrosive, having little or no retaining effect upon the activity of the corrosive constituent. This is, we believe, due to the fact that the interfacial tension between such corrosive constituent and the corrosible surface is greater than the interfacial tension between the inactive constituent and said surface. The surface is thus preferentially wetted by a thin film of the corrosive constituent which adheres thereto, forcing the inactive constituent out of contact therewith.

A specific example of such a system is one involving a metal which is corroded by brine which occurs in admixture with certain petroleum crudes, which latter are in themselves not corrosive. Another important commercial example of such a system is that which is encountered in the production of sulphur and in which the metal of the tubing strings is in contact with a mixture comprising molten sulphur, which is not in itself corrosive, together with a hot saline solution, containing also hydrogen sulphide, which latter is highly corrosive.

In such systems the extent and nature of the corrosive action is determined by the phenomenon of preferential wetting. This is dependent upon the inherent natures of the metal and of the two liquids, and is determined by the relative interfacial tensions between the metal and the respective liquids. Provided these interfacial tension relationships are such as to permit the corrosive constituent to wet the metal surface, corrosion will occur. If, on the other hand, the relationship between the interfacial tensions is such as to cause the non-corrosive constituent preferentially to wet the metal surface, the metal will be protected against corrosion by a continuous and constantly renewed film of non-corrosive substance. We have discovered that in systems of the type here considered, it is possible, by appropriate treatment of one or the other constituents, so to vary their relative physical characteristics as to cause the non-corrosive liquid to wet the metal surface. By this means, there is maintained upon the immersed metal surface a protective film of the non-corrosive liquid thus obviating corrosion at its source by inherent insulation of the corrodible surface from the active agent in the mixture.

As related specifically to corrosive mixtures of petroleum and brines, it is possible to cause the petroleum, rather than the salt water, to wet the metal surface through the agency of any one of a large number of addition agents. Organic acid materials which dissolve in the oil are extremely effective. The aliphatic acids of the class represented by oleic, stearic and palmitic acids have been used with marked success, as have also the oil soluble salts of these acids, particularly calcium, aluminum, or iron stearates and oleates. Naphthenic acids, which are recovered during the refining of crude oils, when added to a mixture of petroleum and a corrosive brine, cause the metal which is subject to the corrosive action to be wetted by the petroleum rather than by the brine. These naphthenic acids may be added by the use of certain products and by-products of petroleum refining which contain considerable quantities of naphthenic acids. An example of such a by-product is the residue which remains in petroleum stills after the distillation of certain crude oils. Various metallic salts of the naphthenic acids are equally effective. A similar result can be obtained by adding to the peroleum small quantities of any of a great number of benzol derivatives such as crude benzol, benzene, toluene, xylene, solvent naptha, monochlorodichlorbenzene, phenol, cresols, or the like. Other coal tar derivatives such as naphthalene, naphthol, anthracene, or crude coal tar produce the same effect.

The use of the additional agents named above has been found to be particularly beneficial in the case of systems involving petroleum hydrocarbons together with corrosive liquids. For example, we have found that systems in which the corrosive liquid comprised a brine rich in hydrogen sulphide, the addition of one part iron stearate to four or five thousand parts of the petroleum mixture afforded ample protection to conventional steel storage tanks and piping. Similar methods of corrosion prevention may be applied to other systems which involve a mixture of a corrosive with a non-corrosive liquid. The nature of the precise treating agent to be employed in any such case will depend upon the characteristics of both of the liquids and of the metal in question.

It will thus be observed that we have provided an efficient and inexpensive method of treatment by which normally corrosive mixtures having a corrosive and a non-corrosive constituent are rendered inactive against such substances as the common metals, without the use of elaborate mechanical systems, and without materially changing the chemical composition of the mixture. Such mixtures, when treated in accordance with our invention, may be stored and conveyed in tanks, pipes, and other apparatus of steel or cast iron without damage.

We are aware that other substances may be substituted for those herein disclosed as suitable addition agents for treating corrosive mixtures of petroleum, and that other corrosive mixtures having a corrosive and a non-corrosive constituent may be similarly treated to cause preferential wetting of the corrodible surface by the non-corrosive constituent. We, therefore, claim our invention broadly as indicated by the appended claims.

What we claim is:

1. The method of protecting from corrosive action a corrodible surface which is immersed in a liquid mixture having a non-corrosive constituent and a corrosive constituent, which corrosive constituent normally wets the corrodible surface to the exclusion of the non-corrosive constituent, which method comprises adding to said mixture an agent causing the non-corrosive constituent to preferentially wet said surface and form on the immersed corrodible surface a continuous non-corrosive film protecting said surface from contact with the corrosive constituent.

2. The method of protecting from corrosive action a corrodible surface which is immersed in a liquid mixture having a corrosive and a non-corrosive constituent, the corrosive constituent normally having with said surface a greater interfacial tension than the non-corrosive constituent, which comprises adding to the mixture an agent effecting inversion of said relative interfacial tensions, whereby the non-corrosive constituent is caused to wet said surface preferentially and form on the immersed corrodible surface a continuous non-corrosive film protecting said surface from contact with the corrosive constituent.

3. The method of protecting from corrosive action a metallic surface which is immersed in a liquid mixture having a corrosive and a non-corrosive constituent, the corrosive constituent normally having a greater interfacial tension with respect to the immersed metallic surface than the non-corrosive constituent, which comprises the addition to the mixture of an agent effecting inversion of the relative interfacial tensions whereby the non-corrosive constituent is caused to wet said surface preferentially and form on the immersed corrodible surface a continuous non-corrosive film protecting said surface from contact with the corrosive constituent.

4. The method of protecting from corrosive action a metallic surface which is immersed in a mixture of petroleum and a corrosive aqueous solution, by which the said surface is normally wetted preferentially and corroded, which comprises the addition to the mixture of an agent causing the petroleum to wet the surface preferentially and form on the immersed corrodible surface a continuous protective film insulating said surface from the corrosive aqueous solution.

5. The method of protecting from corrosive action a metallic surface which is immersed in a mixture of petroleum and an aqueous solution, said surface being normally preferentially wetted and corroded by said last mentioned constituent, which comprises the addition to the mixture of an oil soluble agent causing the petroleum to preferentially wet said surface and form on the immersed corrodible surface a continuous protective film insulating said surface from contact with the aqueous solution.

6. The method of protecting from corrosive action a metallic surface which is immersed in a mixture of petroleum and brine which comprises the addition to the mixture of an oil soluble organic acid material causing the petroleum to wet said surface preferentially and form on the immersed corrodible surface a continuous protective film insulating said surface from contact with the brine.

7. The method of protecting from corrosive action a metallic surface which is immersed in a mixture of petroleum and brine which comprises the addition to the mixture of an oil soluble salt of an organic acid causing the petroleum to wet said surface in preference to the brine and to form on the immersed corrodible surface a continuous protective film insulating said surface from contact with the brine.

8. The method of protecting from corrosive action a metallic surface which is immersed in a mixture of petroleum and brine which comprises the addition to the mixture of a salt such as calcium stearate, causing the petroleum to wet said surface in preference to the brine and to form on the immersed corrodible surface a continuous film potecting said surface from contact with the brine.

9. The method of protecting from corrosive action a metallic surface which is immersed in a mixture of petroleum and brine which comprises the addition to the mixture of a small quantity of a coaltar derivative of such a nature as to cause the petroleum to wet said immersed surface in preference to the brine thereby forming a continuous film of petroleum protecting said surface from contact with the brine.

10. The method of protecting from corrosive action a metallic surface which is immersed in a mixture of petroleum and brine which comprises the addition to the mixture of a small quantity of benzol whereby the petroleum is caused to wet said immersed surface in preference to the brine so as to form thereon a continuous film protecting said surface from contact with the brine.

11. The method of protecting from corrosive action a metallic surface which is immersed in a mixture of petroleum and brine which comprises the addition to the mixture of a naphthenic acid material of such nature as to cause a preferential wetting of said immersed surface by the petroleum so as to form a continuous film protecting said surface from contact with the brine.

12. The method of protecting from corrosive action a metallic surface which is immersed in a mixture of petroleum and brine which comprises the addition to the mixture of a metallic salt of a naphthenic acid causing a preferential wetting of said surface by the petroleum so as to form on the immersed corrodible surface a continuous film protecting said surface from contact with the brine.

13. The method of protecting from corrosive action a metallic surface which is immersed in a mixture of petroleum and brine which comprises the addition to the mixture of a quantity of petroleum still residue rich in naphthenic acid causing a preferential wetting of the surface by the petroleum so as to form on the immersed corrodible surface a continuous film protecting said surface from contact with the brine.

STANLEY GILL.
STANTON U. McGARY.